(12) United States Patent
Wagoner et al.

(10) Patent No.: US 9,099,930 B2
(45) Date of Patent: Aug. 4, 2015

(54) POWER CONVERTER AND METHOD OF ASSEMBLING THE SAME

(75) Inventors: Robert Gregory Wagoner, Roanoke, VA (US); Allen Michael Ritter, Roanoke, VA (US); Mark Eugene Shepard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 513 days.

(21) Appl. No.: 13/530,902

(22) Filed: Jun. 22, 2012

(65) Prior Publication Data

US 2013/0342019 A1 Dec. 26, 2013

(51) Int. Cl.
*H02J 1/00* (2006.01)
*H02J 3/00* (2006.01)
*H02M 1/34* (2007.01)
*H02M 7/00* (2006.01)
*H02M 7/483* (2007.01)

(52) U.S. Cl.
CPC ............... *H02M 1/34* (2013.01); *H02M 7/003* (2013.01); *H02M 7/483* (2013.01); *Y10T 29/4902* (2015.01); *Y10T 307/707* (2015.04)

(58) Field of Classification Search
USPC ............................ 307/82; 363/34; 399/37, 88
See application file for complete search history.

(56) References Cited

U.S. PATENT DOCUMENTS

| 4,151,387 | A | 4/1979 | Peters, Jr. |
| 5,424,579 | A | 6/1995 | Arai et al. |
| 5,574,312 | A | 11/1996 | Bayerer et al. |
| 6,654,260 | B2 | 11/2003 | Okayama et al. |
| 7,327,024 | B2 * | 2/2008 | Stevanovic et al. ........... 257/691 |
| 2006/0175630 | A1 | 8/2006 | Meier |
| 2011/0260547 | A1 * | 10/2011 | Wang et al. .................... 307/82 |
| 2012/0218785 | A1 | 8/2012 | Li et al. |
| 2014/0111959 | A1 | 4/2014 | Li et al. |

FOREIGN PATENT DOCUMENTS

EP 2677847 A2 12/2013

* cited by examiner

*Primary Examiner* — Rexford Barnie
*Assistant Examiner* — Xuan Ly
(74) *Attorney, Agent, or Firm* — James McGinness, Esq.; Armstrong Teasdale LLP (57) ABSTRACT

A power converter includes a plurality of power conversion modules. At least one power conversion module includes a plurality of power conversion devices defining a three-level bridge. A first power conversion module includes four terminals including one of a positive terminal and a negative terminal, an output terminal, a first neutral terminal, and a second neutral terminal. The first neutral terminal is coupled to a direct current (DC) link and the second neutral terminal is coupled to a second power conversion module.

20 Claims, 10 Drawing Sheets

POWER CONVERTER AND METHOD OF ASSEMBLING THE SAME

BACKGROUND OF THE INVENTION

The subject matter described herein relates generally to power conversion within electric power systems, and more specifically, to low-inductance, three-level, neutral point clamped (NPC) power converters for electric power generation assets.

Generally, a wind turbine includes a rotor that includes a rotatable hub assembly having multiple blades. The blades transform wind energy into a mechanical rotational torque that drives one or more generators via the rotor. At least some of the known wind turbines are physically nested together in a common geographical region to form a wind turbine farm. Variable speed operation of the wind turbine facilitates enhanced capture of energy when compared to a constant speed operation of the wind turbine. However, variable speed operation of the wind turbine produces electric power having varying voltage and/or frequency. More specifically, the frequency of the electric power generated by the variable speed wind turbine is proportional to the speed of rotation of the rotor. A power converter may be coupled between the wind turbine's electric generator and an electric utility grid. The power converter receives electric power from the wind turbine generator and transmits electricity having a fixed voltage and frequency for further transmission to the utility grid via a transformer. The transformer may be coupled to a plurality of power converters associated with the wind turbine farm.

Many known power converters include a plurality of power conversion devices, i.e., power modules that include semiconductor devices such as insulated gate bipolar transistors (IGBTs). The IGBTs, other electronic devices, and the associated electrically conductive connections that form the power modules have known inductances and the associated impedances. The impedances are proportional to the frequencies of the signals transmitted therethrough. As such, transmitting electric current through such power modules at high switching frequencies induces electromagnetic fields that may induce unwanted voltages and currents, thereby increasing switching losses and voltage overshoots. Significantly, some diode devices will experience a reverse recovery that induces a voltage and current spike that is transmitted through briefly-formed commutation loops. The deleterious effects of such commutation loops are proportional to the associated inductance of the loops, and such effects may include high voltage stresses on the semiconductor devices. Moreover, such unwanted voltages and currents may include harmonics affecting the power quality of the electric power transmitted from the power converters. As the switching losses increase and demands for more robust power converters escalate, the size, weight, and cost of the power modules, and, therefore, the power converters, increase proportionally to compensate.

Three-level bridge configurations that generate three voltages, i.e., a positive voltage, a neutral voltage, and a negative voltage, facilitate faster power converter switching speeds, i.e., rates of voltage transitions measured at the output terminals of the converter, than other bridge configurations, thereby facilitating improved power quality. However, configuring such three-level bridges, with the associated heat sinks, as well as the power conversion components and the conductors therebetween, significantly increases the challenges associated with maintaining the inductances of the power modules low enough to reduce the negative impact of higher switching speeds of the power converters. Limiting the switching speeds of the power converters due to the inherent inductances of the modules therein limits the performance advantages associated with the higher switching speeds, and facilitates increased size, weight, and cost of power converters.

BRIEF DESCRIPTION OF THE INVENTION

In one aspect, a power converter is provided. The power converter includes a plurality of power conversion modules. At least one power conversion module includes a plurality of power conversion devices defining a three-level bridge. A first power conversion module includes four terminals including one of a positive terminal and a negative terminal, an output terminal, a first neutral terminal, and a second neutral terminal. The first neutral terminal is coupled to a direct current (DC) link and the second neutral terminal is coupled to a second power conversion module.

In another aspect, a method of assembling a power converter is provided. The method includes providing a first power conversion module and a second power conversion module. Each power conversion module defines a three-level bridge. The method also includes forming a four terminal circuit within the first power conversion module by coupling one of a positive terminal and a negative terminal to one of a positive conduit and a negative conduit, respectively. The method also includes coupling a first neutral terminal to a direct current (DC) link and coupling a second neutral terminal to the second power conversion module.

In yet another aspect, an energy generation facility is provided. The facility includes at least one energy generator. The facility also includes a power converter coupled to the energy generator and coupled to an electric power grid. The power converter includes a plurality of power conversion modules. At least one power conversion module includes a plurality of power conversion devices defining a three-level bridge. A first power conversion module includes four terminals including one of a positive terminal and a negative terminal, an output terminal, a first neutral terminal, and a second neutral terminal. The first neutral terminal is coupled to a direct current (DC) link and the second neutral terminal is coupled to a second power conversion module.

DETAILED DESCRIPTION OF THE INVENTION

As used herein, the term "blade" is intended to be representative of any device that provides reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "electric power generation device" is intended to be representative of any device that provides electric power derived from an energy resource. As used herein, the term "wind turbine generator" is intended to be representative of any wind turbine that includes an electric power generation device that generates electrical power from rotational energy generated from wind energy, and more specifically, converts mechanical energy converted from kinetic energy of wind to electrical power.

Technical effects of the methods, apparatus, and systems described herein include at least one of: (a) facilitating the use of three-level bridge configurations in power converters; (b) decreasing the inductance of commutating loops defined in a three-level bridge configuration, thereby facilitating flux cancellation in commutation loops when current flows therethrough and decreasing the energy stored in the loop currents induced in the commutating loops through routine switching actions; (c) increasing the switching speed of power converters for a given IGBT switching frequency as compared to other bridge configurations; (d) increasing the output voltage of power converters as compared to other bridge configurations; (e) improving the power quality by reducing the harmonics for similar switching speeds of power converters for a given IGBT frequency as compared to other bridge configurations; and (f) increasing power ratings of power converters without equivalent increases in size and weight.

The methods, apparatus, and systems described herein facilitate transmitting electric power from renewable and non-renewable electric power generation assets. Also, the methods, apparatus, and systems described herein facilitate transmitting electric power to electric motor drive devices. Specifically, the methods, apparatus, and systems described herein facilitate generating and transmitting increased electric power using power converters with a smaller physical footprint. More specifically, the apparatus and systems described herein facilitate using single IGBTs and diodes in a low-inductance, three-level bridge, neutral point clamped (NPC) configuration in power converters, thereby facilitating an increase in the switching speeds and the power ratings of the power converters without similarly increasing the size of the power converters.

Although generally described herein with respect to a wind turbine facility, the systems described herein are applicable to any type of electric systems including, for example, and without limitation, renewable energy sources such as solar power generation systems, fuel cells, geothermal generators, hydropower generators, non-renewable energy sources such as fossil and nuclear power plants, and motor drive devices.

Figure 1:
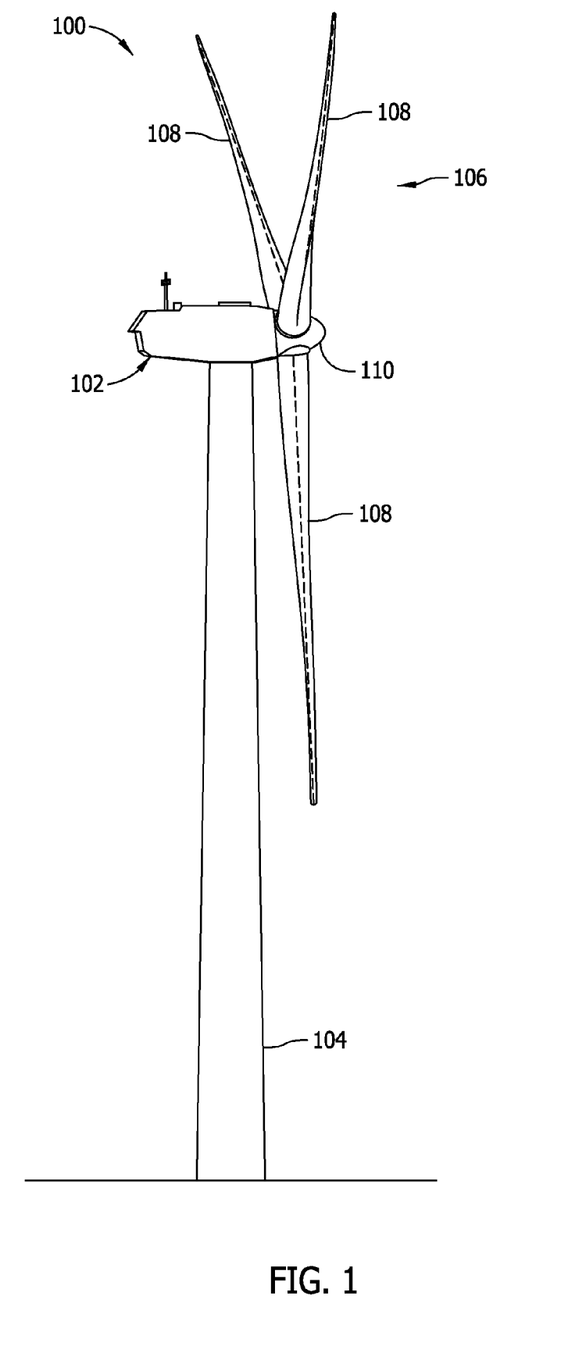
FIG. 1 is a schematic view of an exemplary wind turbine.

FIG. 1 is a schematic view of an exemplary wind turbine generator 100. Wind turbine generator 100 is an electric power generation device including a nacelle 102 housing a generator (not shown in FIG. 1). Nacelle 102 is mounted on a tower 104 (a portion of tower 104 being shown in FIG. 1). Tower 104 may be any height that facilitates operation of wind turbine generator 100 as described herein. Wind turbine generator 100 also includes a rotor 106 that includes three rotor blades 108 attached to a rotating hub 110. Alternatively, wind turbine generator 100 includes any number of blades 108 that facilitates operation of wind turbine generator 100 as described herein. In the exemplary embodiment, wind turbine generator 100 includes a gearbox (not shown in FIG. 1) rotatably coupled to rotor 106 and a generator (not shown in FIG. 1). While only one wind turbine generator 100 is shown, a plurality of wind turbine generators 100 may be at least partially grouped geographically and/or electrically to define a renewable energy generation facility, i.e., a wind turbine farm (not shown in FIG. 1). Such a wind turbine farm may be defined by a number of wind turbine generators 100 in a particular geographic area, or alternatively, defined by the electrical connectivity of each wind turbine generator 100 to a common substation.

Figure 2:
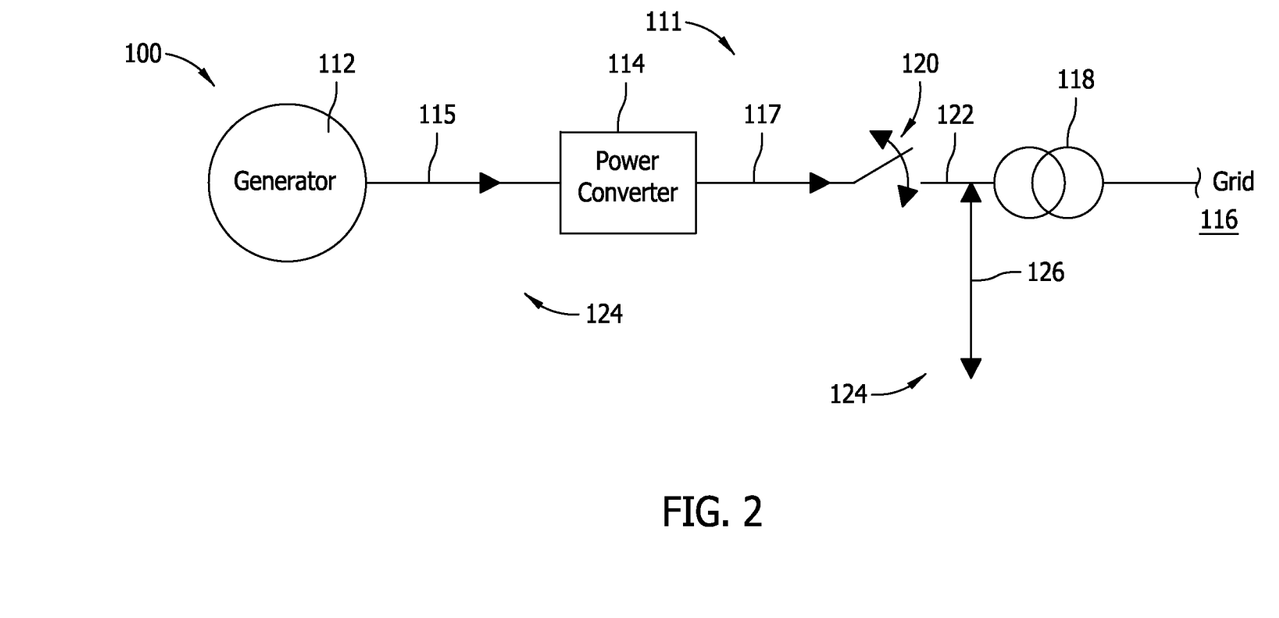
FIG. 2 is a schematic view of an exemplary power conversion and transmission system that may be used with the wind turbine shown in FIG. 1.

FIG. 2 is a schematic view of an exemplary power conversion and transmission system 111 that may be used with wind turbine generator 100. Wind turbine generator 100 is a renewable energy source that includes an electric power generator 112 coupled to a first power source, i.e., a power converter 114, through a plurality of input conduits 115 (only one shown in FIG. 2). Electric power generator 112 is any type of generator that enables operation of wind turbine generator 100 as described herein, including, without limitation, a synchronous permanent magnet generator (PMG), an electrically excited synchronous generator (EESG), and a doubly-fed induction generator (DFIG).

Power converter 114 is any device that enables operation of wind turbine generator 100 as described herein, including, without limitation, a full power conversion assembly. In the exemplary embodiment, electrical, three-phase, sinusoidal, AC power is generated within electric power generator 112 and is transmitted to power converter 114 through input conduits 115. Within power converter 114, the electrical power is rectified in a converter portion (not shown in FIG. 2) from sinusoidal, three-phase AC power to direct current (DC) power. The DC power is transmitted to an inverter (not shown in FIG. 2) that converts the DC electrical power to three-phase, sinusoidal AC electrical power with regulated voltages, currents, and frequencies. Power converter 114 compensates or adjusts the frequency of the three-phase power from electric power generator 112 for changes, for example, in the wind speed at hub 110 and blades 108 (both shown in FIG. 1). Therefore, in this manner, mechanical and electrical rotor frequencies are decoupled from grid frequency.

Power converter 114 is coupled to an electric power grid 116 via a plurality of output conduits 117 (only one shown in FIG. 2), a main transformer 118, a main transformer circuit breaker 120, and a main transformer bus 122. When circuit breaker 120 is closed, three-phase AC electric power is transmitted from power converter 114 to electric power grid 116 for further transmission and distribution.

While only one wind turbine generator 100 is shown, a plurality of wind turbine generators 100 may be at least partially grouped geographically and/or electrically to define a renewable energy generation facility, i.e., a wind turbine farm 124. Each wind turbine generator 100 is coupled to main transformer bus 122 through a substation bus 126. Such wind turbine farm 124 may be defined by a number of wind turbine generators 100 in a particular geographic area, or alternatively, defined by the electrical connectivity of each wind turbine generator 100 to a common substation.

In some alternative embodiments, a combination of electric power generation devices are used in conjunction with, or in place of, wind turbine generator 100. In at least one alternative embodiment, wind turbine generator 100 is replaced with solar panels (not shown) coupled to form one or more solar arrays (not shown) to facilitate operating at a desired power output with supplemental, solar-generated power. Solar panels include, in one alternative embodiment, one or more of a photovoltaic panel, a solar thermal collector, or any other device that converts solar energy to electrical energy. In such alternative embodiments, each solar panel is a photovoltaic panel that generates a substantially direct current power as a result of solar energy striking solar panels.

Also, in such alternative embodiments, each solar array is coupled to a power converter that is similar to at least a portion of power converter 114 that converts the DC power to AC power that is transmitted to a transformer similar to transformer 118 and then to grid 116. Furthermore, although generally described herein with respect to wind turbine generator 100 and a solar array facility, the methods and systems described herein are applicable to any type of electric generation system including, for example, fuel cells, geothermal generators, hydropower generators, and/or other devices that generate power from renewable and/or non-renewable energy sources.

Figure 3:
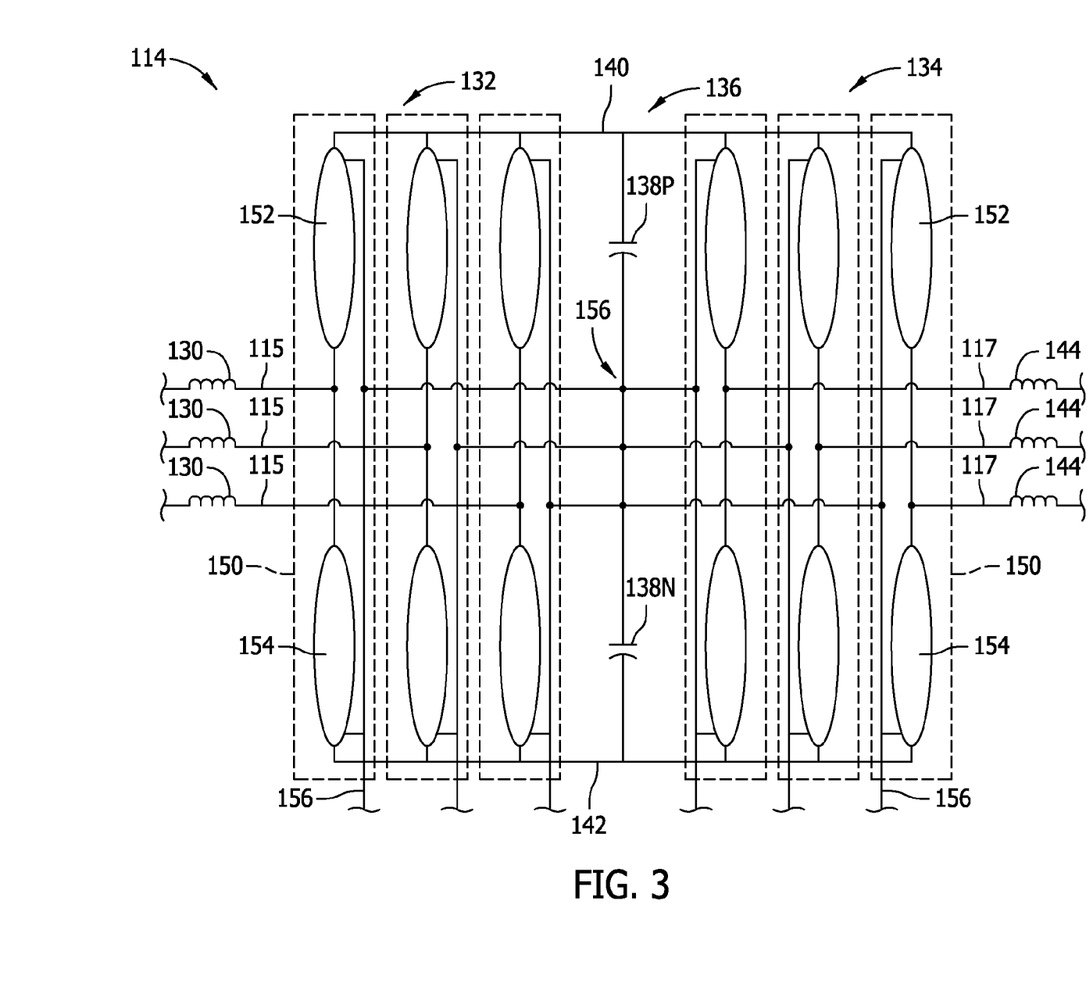
FIG. 3 is a schematic overhead view of an exemplary power converter that may be used with the system shown in FIG. 2.

FIG. 3 is a schematic overhead view of power converter 114 that may be used with power conversion and transmission system 111 (shown in FIG. 2). Each of three input conduits 115 is configured such that the input current is split between each conduit 115. At least one boost inductor 130 is coupled to each of input conduits 115. Boost inductors 130 facilitate filtering the input voltage and/or current received from generator 112 (shown in FIG. 2). In addition, at least a portion of the energy received from generator 112 is temporarily stored within each boost inductor 130.

In the exemplary embodiment, power converter 114 includes an AC-to-DC converter portion 132 and a DC-to-AC inverter portion 134 coupled together by a DC bus system 136. Therefore, power converter 114 is a full power converter. Alternatively, for those embodiments that include electric power generation devices such as, without limitation, solar arrays, that generate a DC voltage, converter portion 132 may be replaced with, or supplemented with, a DC-to-DC boost converter. Moreover, in the exemplary embodiment, DC bus system 136 includes capacitors 138, i.e., capacitors 138P and 138N. Alternatively, DC bus system 136 includes any number of capacitors 138 and/or any other electrical power storage devices that enable power converter 114 to function as described herein. DC bus system 136 also includes a positive rail 140 and a negative rail 142. At least one filtering inductor 144 is coupled to each of output conduits 117. Inductors 144 facilitate filtering the output voltage and/or current transmitted from inverter portion 134.

In operation, converter portion 132 is coupled to, and receives AC power from, generator 112 through input conduits 115. Converter portion 132 rectifies the AC power to a predetermined DC voltage. As power is transmitted through converter portion 132, a DC voltage is induced across DC bus system 136 and energy is stored within capacitors 138. Inverter portion 134 converts DC power transmitted from DC bus system 136 into AC power for transmission to electric power grid 116 (shown in FIG. 2) through output conduits 117.

In the exemplary embodiment, both converter portion 132 and inverter portion 134 include a plurality of phase segments 150, i.e., one phase segment 150 for each of the three phases transmitted from generator 112 and transmitted to grid 116. Each of segments 150 includes a first power conversion module 152 and a second power conversion module 154 coupled together in serial arrangement for each phase of electrical power that power converter 114 generates. For each segment 150 in converter portion 132, first power conversion module 152 extends between positive rail 140 and input conduit 115 and second power conversion module 154 extends between negative rail 142 and input conduit 115. Also, for each segment 150 in inverter portion 134, first power conversion module 152 extends between positive rail 140 and output conduit 117 and second power conversion module 154 extends between negative rail 142 and output conduit 117. Each of legs 150 include a neutral bus connection 156 coupled to each of upper portion 152 and lower portion 154, thereby defining power converter 114 as a three-level converter that facilitates a bridge configuration that generates three voltages, i.e., a positive voltage, a neutral voltage, and a negative voltage.

Each of segments 150 include a neutral bus connection 156 coupled to each of first power conversion module 152 and second power conversion module 154, thereby defining power converter 114 as a three-level converter that facilitates a bridge configuration that generate three voltages, i.e., a positive voltage, a neutral voltage, and a negative voltage. All six phase segments 150 are substantially identical with the principle exception that three of the six phase segments 150 are coupled to input conduits 115 and the other three phase legs 150 are coupled to output conduits 117. Otherwise, each phase leg 150 of converter portion 132 and inverter portion 134 are substantially similar and each includes modules 152 and 154 coupled in series.

Figure 4:
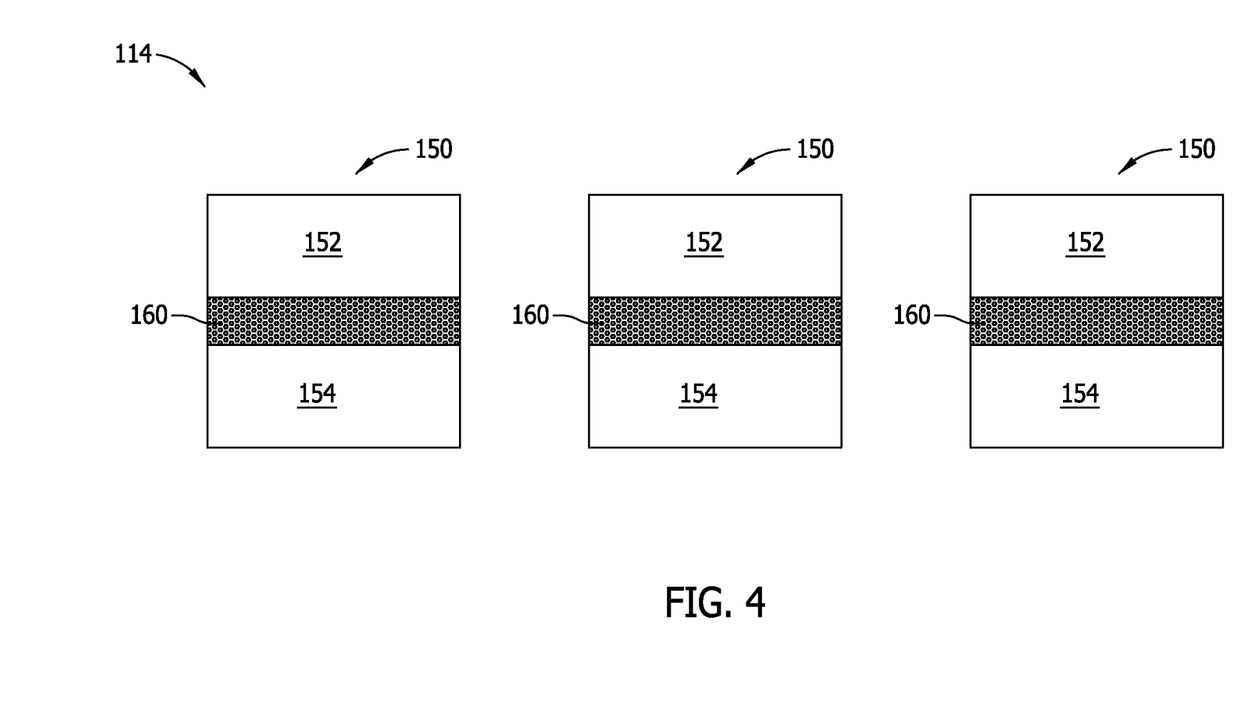
FIG. 4 is a schematic side view of a portion of the power converter shown in FIG. 3.

FIG. 4 is a schematic side view of converter portion 132 of power converter 114. Inverter portion 134 (shown in FIG. 3) is substantially similar in configuration. In the exemplary embodiment, each segment 150 is configured with first power conversion module 152 and second power conversion module 154 coupled to a heat sink device 160. Moreover, modules 152 and 154 are stacked with heat sink device 160 positioned therebetween.

Figure 5:
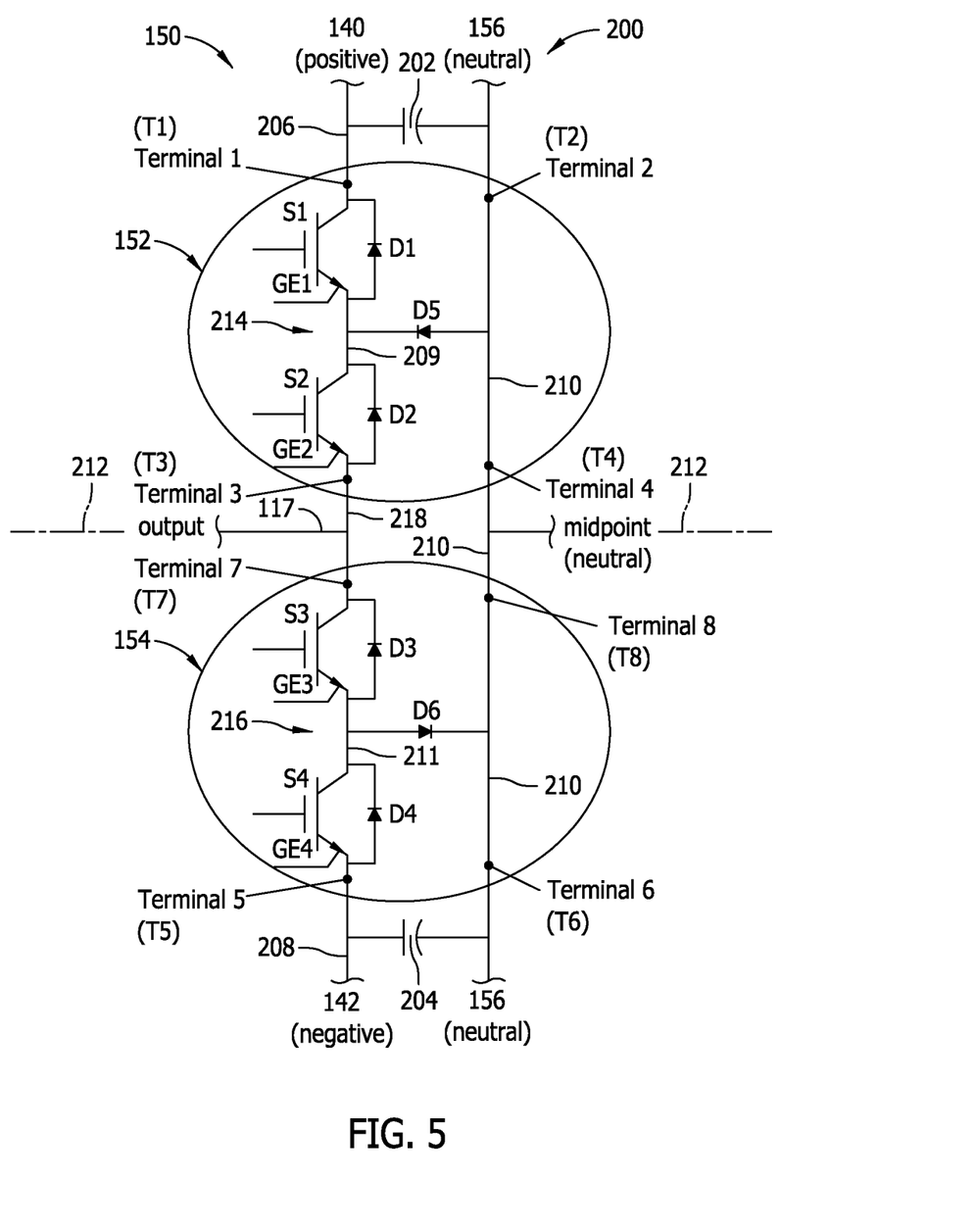
FIG. 5 is a schematic view of an exemplary three-level phase leg that may be used with the power converter shown in FIGS. 3 and 4.

FIG. 5 is a schematic view of an exemplary three-level phase leg 200 of one phase segment 150 of inverter portion 134 (shown in FIG. 3) of power converter 114 (shown in FIG. 3). All six phase segments 150 of converter portion 132 (shown in FIG. 3) and inverter portion 134 are substantially identical with the principle exception that three of the six phase segments 150 are coupled to input conduits 115 (shown in FIG. 3) and the other three phase segments 150 are coupled to output conduits 117. Otherwise, each phase segment 150 of converter portion 132 (shown in FIG. 3) and inverter portion 134 are substantially similar and each includes upper and lower portions 152 and 154, respectively, coupled in series. Three-level phase leg 200 includes an upper capacitor 202 and a lower capacitor 204, wherein capacitors 202 and 204 are external to modules 152 and 154. Three-level phase leg 200 also includes a positive bus 206 coupled to upper capacitor 202, a negative bus 208 coupled to lower capacitor 204, and a midpoint, or neutral bus 210 also coupled to capacitors 202 and 204. Neutral bus 210 is coupled to neutral bus connection 156 through at least one neutral terminal (not shown). Also, neutral bus 210 extends proximate to portions 152 and 154 and extends over positive bus 206 and negative bus 208 with a dielectric material (not shown in FIG. 5) therebetween.

In the exemplary embodiment, power conversion module 152 includes two semiconductor switching devices, i.e., outer switching device S1 and inner switching device S2. Switching devices S1 and S2 are coupled in series through a first switch interconnect bus 209. In the exemplary embodiment, switching devices S1 and S2 are insulated gate bipolar transistors (IGBTs). Alternatively, switching devices S1 and S2 are any other suitable transistor or any other suitable switching device, including, without limitation, gate turn-off thyristors (GTOs). Antiparallel, i.e., inverse diodes D1 and D2 are coupled in parallel with switching devices S1 and S2, respectively.

Also, in the exemplary embodiment, power conversion module 152 includes a clamping diode D5 coupled to neutral bus 210, the output of switching device S1, and the input of switching device S2. The input of switching device S1 is coupled to positive bus 206 and the output of device S1 is coupled to clamping diode D5 and the input to switching device S2 through first switch interconnect bus 209. The output of switching device S2 is coupled to output conduit 117 and an output conduit connection portion 218 (described further below).

Further, in the exemplary embodiment, power conversion module 154 includes an inner switching device S3 and outer switching device S4. Switching devices S3 and S4 are coupled in series through a second switch interconnect bus 211 and are substantially similar to devices S1 and S2. Antiparallel, i.e., inverse diodes D3 and D4 are coupled in parallel with switching devices S3 and S4, respectively.

Moreover, in the exemplary embodiment, power conversion module 154 includes a clamping diode D6 coupled to neutral bus 210 and the output of switching device S3 and the input of switching device S4 through second switch interconnect bus 211. Clamping diode D6 is similar to clamping diode D5, with the exception that diode D6 is reversed with respect to diode D5. The input of switching device S3 is coupled to output conduit 117 and output conduit connection portion 218 (described further below), and the output of device S3 is coupled to clamping diode D6 and the input to switching device S4. The output of switching device S4 is coupled to negative bus 208.

Also, in the exemplary embodiment, each of switching devices S1, S2, S3, and S4 includes a plurality of control connections. Specifically, each switching device S1, S2, S3, and S4 includes gate and emitter control connections GE1, GE2, GE3, and GE4, respectively. Gate and emitter control connections GE1, GE2, GE3, and GE4 are each coupled to an individual drive circuit (not shown) that controls the switching action of associated switching devices S1, S2, S3, and S4, respectively. Alternatively, any control configuration that enables operation of three-level phase leg 200 and power converter 114 as described herein is used.

Further, in the exemplary embodiment, three-level phase leg 200 is "folded over", i.e., as shown in FIG. 4, each phase segment 150 is configured with first power conversion module 152 and second power conversion module 154 coupled to a heat sink device 160 (shown in FIG. 4). Moreover, modules 152 and 154 are positioned, or stacked, with heat sink device 160 positioned therebetween, such that each of modules 152 and 154 are positioned on opposing sides of heat sink device 160. A fold line 212 shows the approximate plane that defines the separation of modules 152 and 154 onto their respective planes on opposing sides of heat sink device 160. Heat transfer is removed from heat sink device 160 through any heat transfer means that enables operation of three-level phase leg 200 and power converter 114 as described herein, including, without limitation, fluid-cooling, e.g., refrigerant-cooling, water-cooling, and air-cooling.

Moreover, in the exemplary embodiment, switching devices S2 and S3 are coupled to each other and output conduit 117 through an output conduit connection portion 218. Positive bus 206, negative bus 208, neutral bus 210, first switch interconnect bus 209, second switch interconnect bus 211, and output conduit connection portion 218 are formed and oriented as low inductance planar bus bars that facilitate a low interconnect inductance within modules 152 and 154. Neutral bus 210 is formed as a small connective conduit extending through modules 152 and 154.

Figure 6:
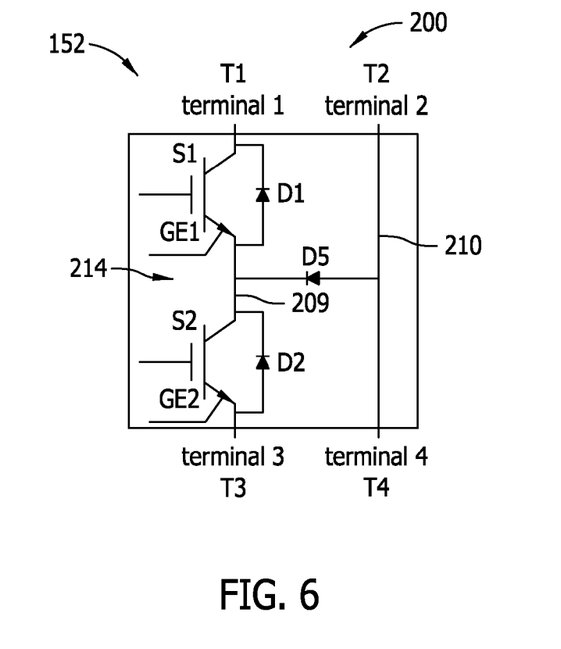
FIG. 6 is a schematic view of a portion of the three-level phase leg shown in FIG. 5.

FIG. 6 is a schematic view of a portion of three-level phase leg 200, i.e., a portion of first power conversion module 152. FIG. 7 is a schematic view of another portion of three-level phase leg 200, i.e., a portion of second power conversion module 154. Referring to FIGS. 5 and 6, in the exemplary embodiment, power conversion module 152 includes four terminals that define an H-bridge circuit 214. Specifically, module 152 includes a positive terminal, i.e., terminal 1 (T1) and an output terminal, i.e., terminal 3 (T3). Module 152 also includes a first neutral terminal, i.e., terminal 2 (T2) and a second neutral terminal, i.e., terminal 4 (T4).

Figure 7:
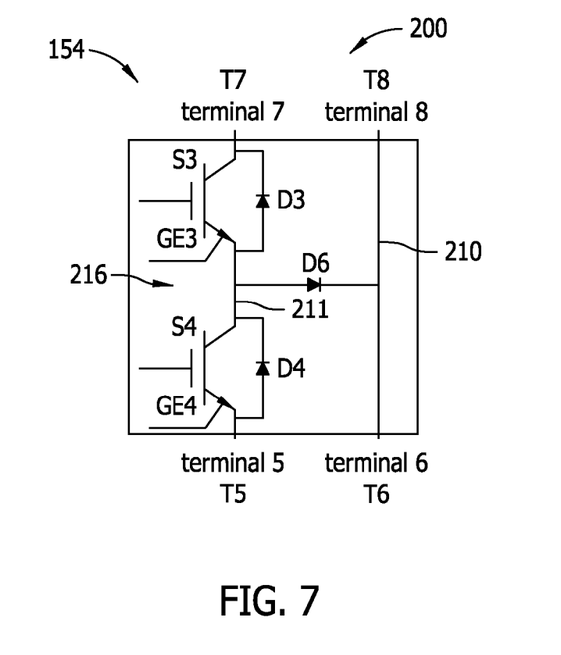
FIG. 7 is a schematic view of another portion of the three-level phase leg shown in FIG. 5.

Similarly, referring to FIGS. 5 and 7, in the exemplary embodiment, power conversion module 154 includes four terminals that define an H-bridge circuit 216. Specifically, module 154 includes a negative terminal, i.e., terminal 5 (T5) and an output terminal, i.e., terminal 7 (T7). Module 154 also includes a first neutral terminal, i.e., terminal 6 (T6) and a second neutral terminal, i.e., terminal 8 (T8).

Referring to FIG. 5, neutral terminals T2, T4, T6, and T8 are positioned in series on neutral bus 210. Neutral terminals T4 and T8 facilitate coupling power conversion modules 152 and 154. Neutral terminals T2 and T6 facilitate coupling neutral bus 210 to neutral bus connection 156. Output terminals T3 and T7 facilitate coupling modules 152 and 154 to output conduit 117. Positive terminal T1 facilitates coupling module 152 to positive rail 140 (shown in FIG. 3). Negative terminal T5 facilitates coupling module 154 to negative rail 142 (shown in FIG. 3). Therefore, in the exemplary embodiment, neutral bus 210 substantially extends the length of three-level phase leg 200 between upper capacitor 202 and lower capacitor 204, including coupling power conversion modules 152 and 154 to each other.

As described above, modules 152 and 154 are "folded over" at fold line 212. Furthermore, modules 152 and 154 are electrically coupled by a connection portion 218 of output conduit 117 that is formed and oriented as a low inductance planar bus bar that facilitates low inductance coupling of modules 152 and 154. Output conduit connection portion 214 is defined between terminals T3 and T7.

In the exemplary embodiment, on first power conversion module 152, terminal T1 is positioned physically proximate to terminal T2 in a range between approximately 1.27 centimeters (cm) (0.5 inches (in.)) and approximately 5.08 cm (2.0 in.). Similarly, terminal T3 is positioned physically proximate to terminal T4 in a range between approximately 1.27 cm (0.5 in.) and approximately 5.08 cm (2.0 in.). Also, in the exemplary embodiment, terminals T1 and T2 are on one end of module 152 and terminals T3 and T4 are on the opposite end of module 152.

Similarly, in the exemplary embodiment, on second power conversion module 154, terminal T5 is positioned physically proximate to terminal T6 in a range between approximately 1.27 cm (0.5 in.) and approximately 5.08 cm (2.0 in.). Terminal T7 is positioned physically proximate to terminal T8 in a range between approximately 1.27 cm (0.5 in.) and approximately 5.08 cm (2.0 in.). Also, in the exemplary embodiment, terminals T5 and T6 are on one end of module 154 and terminals T7 and T8 are on the opposite end of module 154. Therefore, in the exemplary embodiment, terminals T1 through T8 are positioned on three-level phase leg 200 such that decreasing the inductance of leg 200 is facilitated.

In addition to those components described and shown on three-level phase leg 200, additional components (not shown) may be added to increase the flexibility of operation and application of leg 200. For example, without limitation, additional components may include IGBTs, resistors, and thermistors in parallel to switches S1 through S4.

Figure 8:
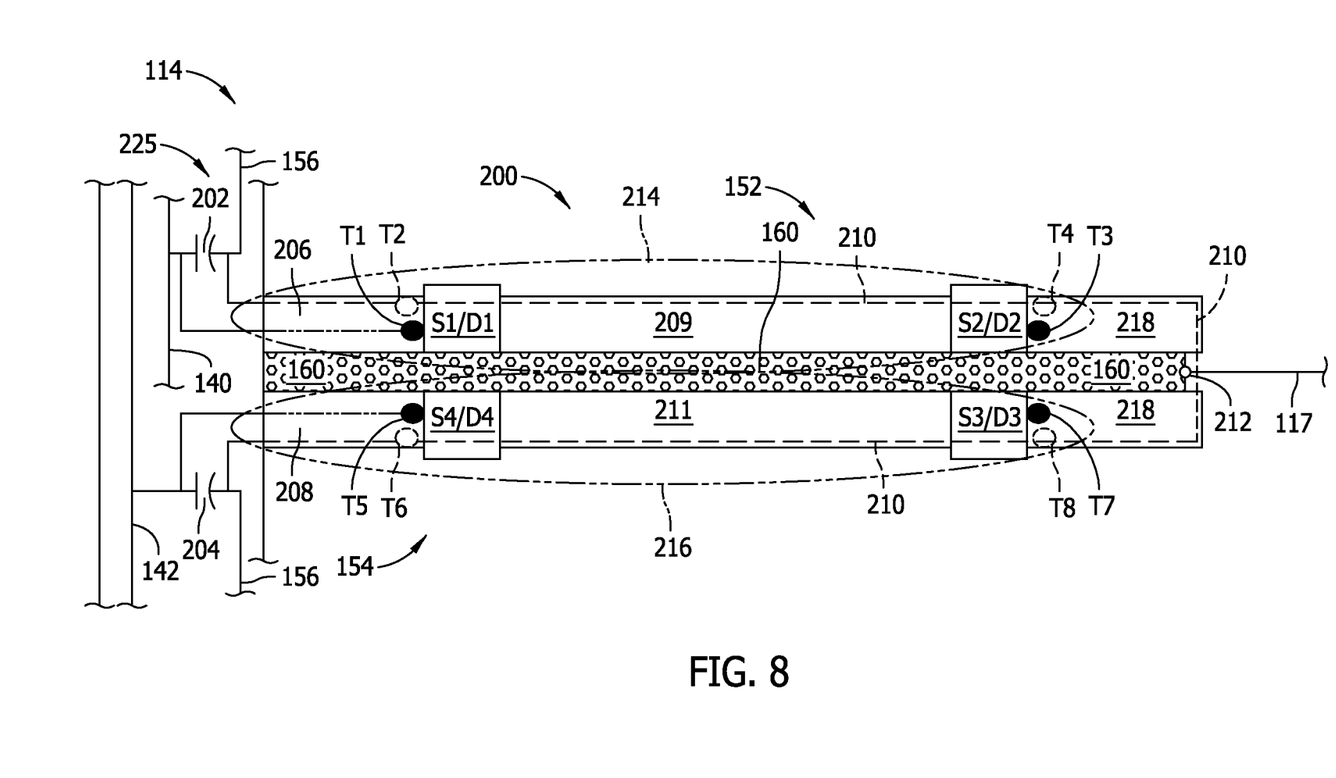
FIG. 8 is a schematic side view of the three-level phase leg shown in FIG. 5.

FIG. 8 is a schematic side view of three-level phase leg 200. Upper capacitor 202 is coupled directly to terminals T1 and T2 using any method the enables operation of three-level phase leg 200 and power converter 114 as described herein. Similarly, lower capacitor 204 is coupled directly to terminals T5 and T6 using any method the enables operation of three-level phase leg 200 and power converter 114 as described herein.

In the exemplary embodiment, positive bus 206, negative bus 208, first switch interconnect bus 209, second switch interconnect bus 211, output conduit connection portion 218, and portions of neutral bus 210 are formed and oriented to define a low inductance planar bus bar configuration that facilitates a low interconnect inductance within three-level phase leg 200, including within modules 152 and 154. Neutral bus 210 is formed and oriented to be substantially parallel to busses 206, 208, 209, 211, and 218 to facilitate such low interconnect inductance. Also, neutral bus 210 is positioned with a spacing between bus 210 and busses 206, 208, 209, 211, and 218 sized to further facilitate a low interconnect inductance within three-level phase leg circuit 200. Further, each of busses 206, 208, 209, 210, 211, and 218 are sized with a predetermined width and insulator 226 is sized with a predetermined thickness such that a thickness value of insulator 226 is small as compared to a width value of busses 206, 208, 209, 210, 211, and 218. For example, and without limitation, a bus width-to-insulator thickness ratio is approximately 10:1. Further, a non-conducting, electrically-insulating material (not shown) is positioned between neutral bus 210 and each of busses 206, 208, 209, 211, and 218 to decrease the potential for a short circuit between them.

Also, in the exemplary embodiment, three-level phase leg 200 is "folded over", i.e., each phase segment 150 (shown in FIGS. 3-5) is configured with first power conversion module 152 and second power conversion module 154 coupled to heat sink device 160. Moreover, modules 152 and 154 are positioned, or stacked, with heat sink device 160 positioned therebetween, such that each of modules 152 and 154 are positioned on opposing sides of heat sink device 160. Neutral bus 210 and output conduit connection portion 218 "wrap around" heat sink device 160. Heat transfer is removed from heat sink device 160 through any heat transfer means that enables operation of three-level phase leg circuit 200 and power converter 114 as described herein, including, without limitation, fluid-cooling, e.g., refrigerant-cooling, water-cooling, and air-cooling.

Further, in the exemplary embodiment, positive rail 140 and positive bus 206 are coupled, formed, and oriented such that positive bus 206 and substantially parallel neutral bus 210 define a low inductance planar bus bar configuration to facilitate a low interconnect inductance. Moreover, negative rail 142 and negative bus 208 are coupled, formed, and oriented such that negative bus 208 and substantially parallel neutral bus 210 define a low inductance planar bus bar configuration to facilitate a low interconnect inductance. Also, coupling positive rail 140 and positive bus 206 to each other, coupling negative rail 142 and negative bus 208, and wrapping neutral bus 210 and output conduit connection portion 218 as shown in FIG. 8 facilitates positioning upper portion 152 and positioning lower portion 154 on opposing sides of heat sink device 160. Furthermore, such configuration as shown in FIG. 8 facilitates use of three-level phase leg 200 in space-constrained applications.

Figure 9:
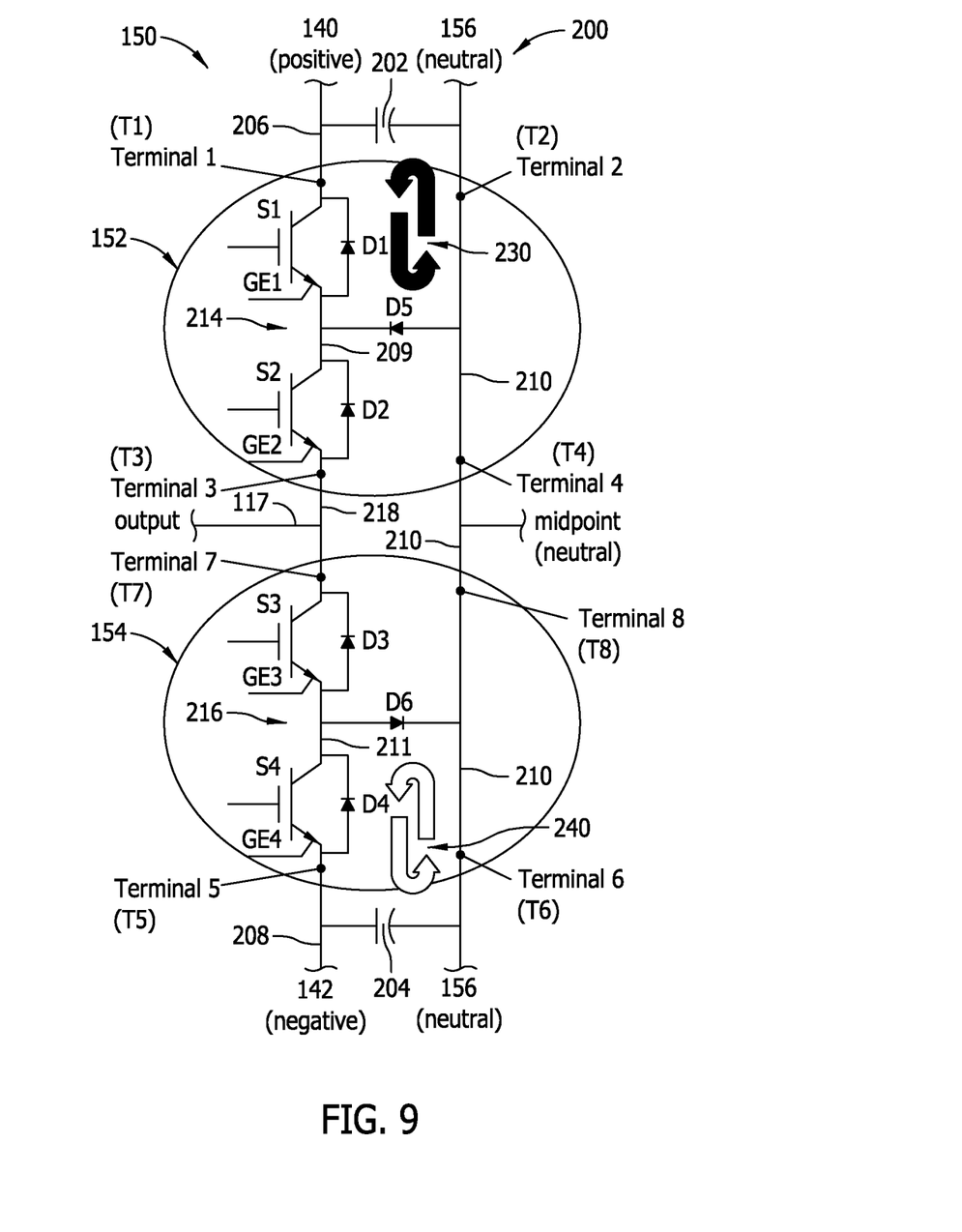
FIG. 9 is a schematic view of a plurality of exemplary small commutating loops in the three-level phase leg shown in FIG. 5.

FIG. 9 is a schematic view of a plurality of exemplary first and second small commutating loops 230 and 240, respectively, in three-level phase leg 200. First small commutating loop 230 is formed during a particular switching transition where outer switching device S1 is initially in an "off" state and inner switching device S2 is initially switched to an "on" state and switching device S1 is switched to an "on" state while switching device S2 remains in the "on" state. Clamping diode D5 is placed in reverse recovery and begins commutating such that current is transmitted through small commutating loop 230 defined by clamping diode D5, upper capacitor 202, and outer switching device switch S1.

Similarly, second small commutating loop 240 is formed during a particular switching transition where inner switching device S3 is initially in an "on" state and outer switching device S4 is initially in an off" state and switching device S4 is switched to an "on" state while switching device S4 remains in the "on" state. Clamping diode D6 is placed in reverse recovery and begins commutating such that current is transmitted through small commutating loop 240 defined by clamping diode D6, lower capacitor 204, and outer switching device switch S4. First and second small commutating loops 230 and 240 are substantially symmetrical.

As described above, terminals T1 through T8 are positioned on three-level phase leg 200 such that decreasing the inductance of leg 200 is facilitated. Specifically, terminals T1 and T2, T3 and T4, T5 and T6, and T7 and T8 are positioned proximate to each other such that the overall physical current flow paths defined by commutating loops 230 and 240 are decreased in size. Moreover, positive bus 206, negative bus 208, first switch interconnect bus 209, neutral bus 210, second switch interconnect bus 211, and output conduit connection portion 218 are formed and oriented to be substantially parallel to at least one of each other, thereby defining a low inductance planar bus bar configuration that facilitates a low interconnect inductance within modules 152 and 154. Also, portions of neutral bus 210 and output conduit connection portion 218 are substantially parallel to each other, thereby further facilitating such low interconnect inductance. Therefore, the associated inductance of commutating loops 230 and 240 is decreased, wherein the inductances of commutation loops 230 and 240 are dominated by the internal inductances of the power semiconductor switching devices S1 and S4 and DC link capacitors 202 and 204. Also, configuring and orienting the electrically-conductive busses within three-level phase leg 200 to facilitate flux cancellation in commutation loops 230 and 240 when current flows therethrough facilitates decreasing the energy stored in the loop currents induced in commutating loops 230 and 240 through routine switching actions.

In general, for typical two-level bridge configurations, inductances for a small loop are in the range between approximately 30 nanohenrys (nH) and approximately 60 nH. In contrast, the inductance of commutating loops 230 and 240 defined in three-level phase leg 200 is within a range between approximately 10 nH and approximately 20 nH.

Figure 10:
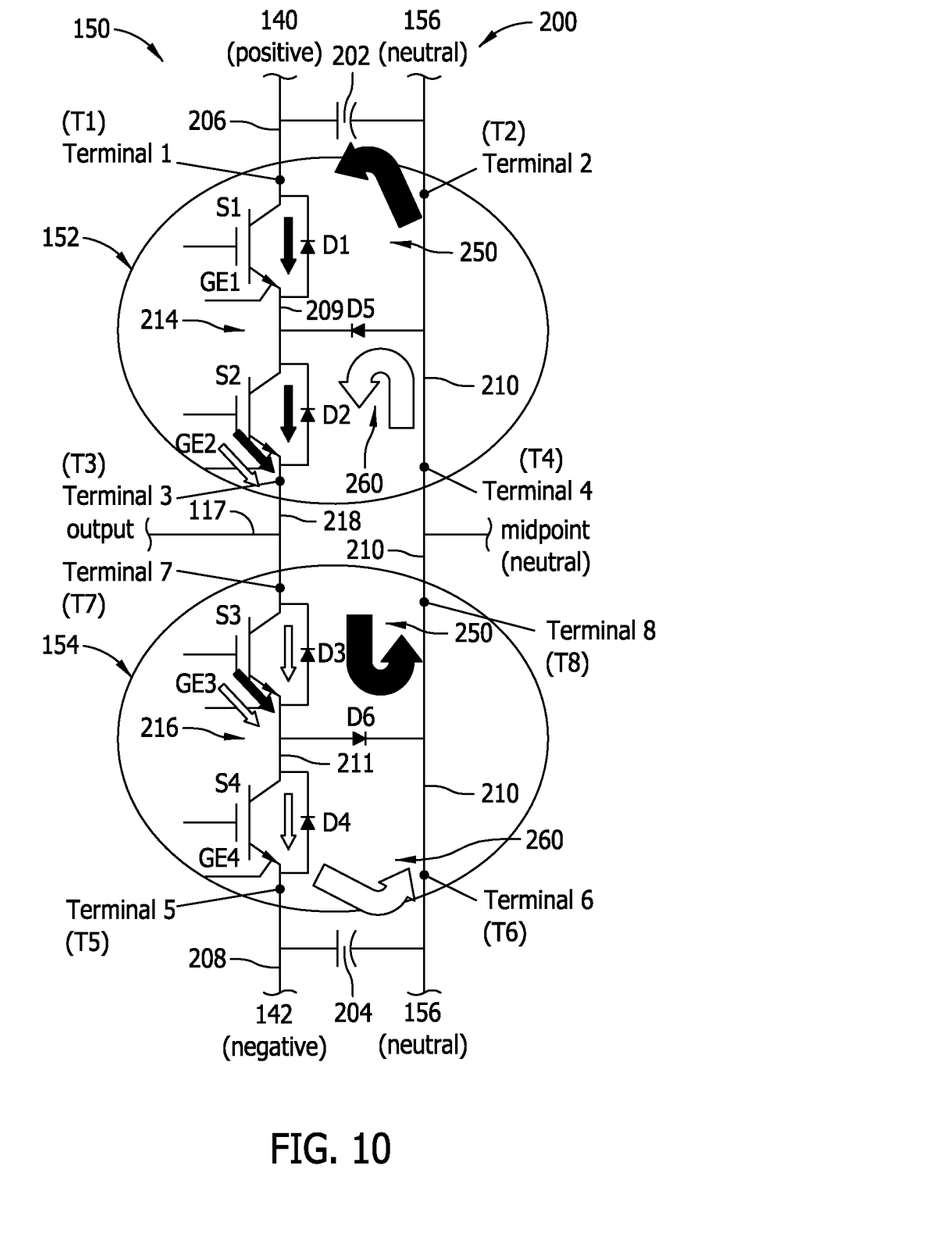
FIG. 10 is a schematic view of a plurality of exemplary large commutating loops in the three-level phase leg shown in FIG. 5.

FIG. 10 is a schematic view of a plurality of exemplary first and second large commutating loops 250 and 260, respectively, in three-level phase leg 200. First large commutating loop 250 is formed during a particular switching transition where inverse diodes D1 and D2 are initially conducting. Inner switching device S3 is switched to an "on" state. Inverse diodes D1 and D2 are placed in reverse recovery and begin commutating such that current is transmitted through large commutating loop 250 defined by clamping diode D6, upper capacitor 202, inverse diode D1, inverse diode D2, and inner switching device S3.

Similarly, second large commutating loop 260 is formed during a particular switching transition where inverse diodes D3 and D4 are initially transmitting. Inner switching device S2 is switched to an "on" state. Inverse diodes D3 and D4 are placed in reverse recovery and begin commutating such that current is transmitted through large commutating loop 260 defined by lower capacitor 204, clamping diode D5, inner switching device S2, inverse diode D3, and inverse diode D4. First and second large commutating loops 250 and 260 are substantially symmetrical.

As described above, terminals T1 through T8 are positioned on three-level phase leg 200 such that decreasing the inductance of leg 200 is facilitated. Specifically, terminals T1 and T2, T3 and T4, T5 and T6, and T7 and T8 are positioned proximate to each other such that the overall physical current flow paths defined by commutating loops 250 and 260 are decreased in size. Moreover, positive bus 206, negative bus 208, first switch interconnect bus 209, neutral bus 210, second switch interconnect bus 211, and output conduit connection portion 218 are formed and oriented to be substantially parallel to at least one of each other, thereby defining a low inductance planar bus bar configuration that facilitates a low interconnect inductance within modules 152 and 154. Also, portions of neutral bus 210 and output conduit connection portion 218 are substantially parallel to each other, thereby further facilitating such low interconnect inductance. Therefore, the associated inductance of commutating loops 250 and 260 is decreased, wherein the inductances of commutation loops 250 and 260 are dominated by the internal inductances of the power semiconductor switching devices S1 and S4 and DC link capacitors 202 and 204. Also, configuring and orienting the electrically-conductive busses within three-level phase leg 200 to facilitate flux cancellation in commutation loops 250 and 260 when current flows therethrough facilitates decreasing the energy stored in the loop currents induced in commutating loops 250 and 260 through routine switching actions.

In general, for typical two-level bridge configurations, inductances for a large loop are in the range between approximately 40 nH and approximately 80 nH. In contrast, the inductance of commutating loops 250 and 260 defined in three-level phase leg 200 is within a range between approximately 10 nH and approximately 30 nH.

Figure 11:
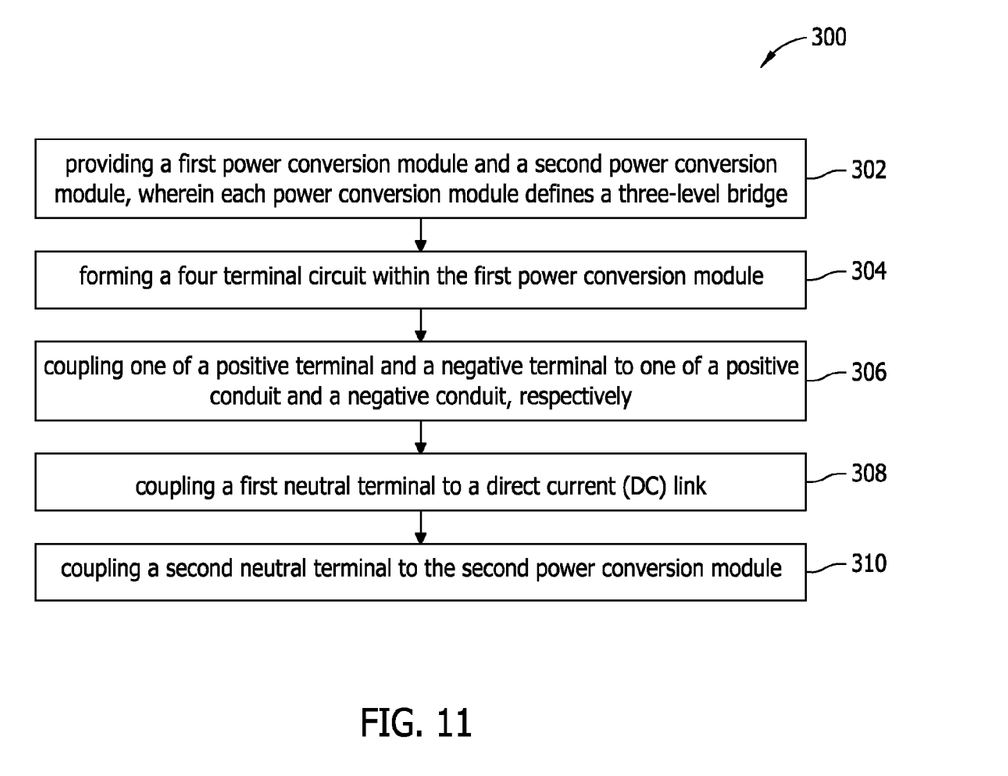
FIG. 11 is a flowchart of an exemplary method of assembling the power converter shown in FIGS. 3 and 4.

FIG. 11 is a flowchart of an exemplary method 300 of assembling power converter 114 (shown in FIGS. 3 and 4). First power conversion module 152 (shown in FIGS. 3-6 and 8-10) and second power conversion module 154 (shown in FIGS. 3-5 and 7-10) are provided 302, wherein each of power conversion modules 152 and 154 defines a three-level bridge 200 (shown in FIGS. 5-10). A four terminal circuit 214 (shown in FIGS. 5-6 and 9-10) is formed 304 within first power conversion module 152. Positive terminal T1 (shown in FIGS. 5-6 and 8-10) is coupled 306 to positive bus 206 (shown in FIGS. 5 and 8-10) and negative terminal T5 (shown in FIGS. 5-6 and 8-10) is coupled 306 to negative bus 208 (shown in FIGS. 5 and 8-10). First neutral terminal T2 (shown in FIGS. 5-6 and 8-10) is coupled 308 to DC bus system 136 (shown in FIG. 3). Second neutral terminal T4 (shown in FIGS. 5-6 and 8-10) is coupled 310 to second power conversion module 154.

The above-described embodiments facilitate efficient and cost-effective operation of electric power generation assets, including renewable electric power generation facilities such as wind turbine generators and a solar arrays, and non-renewable electric power generation facilities such as fossil fuel and nuclear power plants. The above-described embodiments also facilitate efficient and cost-effective operation of motor drive devices. The electric power generation facilities and motor drive devices include a power converter that facilitates generating and transmitting increased electric power using power converters with a smaller physical footprint. More specifically, the power converter described herein uses a three-level bridge configuration, thereby facilitating an increase in the switching speed of the power converters for a given IGBT switching frequency. Such increase in switching speed is facilitated by decreasing the inductance of commutating loops typically defined in three-level bridge configurations, thereby facilitating flux cancellation in the commutation loop when current flows therethrough, thereby facilitating a reduction of energy stored within loop currents induced therein through routine switching actions. Also, the output voltage of the power converter is increased and the power quality is improved by reducing the harmonics for similar switching speeds.

Exemplary embodiments of power converters are described above in detail. The power converters are not limited to the specific embodiments described herein, but rather, components of the power converters may be utilized independently and separately from other components and/or steps described herein. For example, the power converters may also be used in combination with other industrial power conversion systems and electric power generation systems, and are not limited to practice with only the renewable electric power generation facilities as described herein. Rather, the exemplary embodiment can be implemented and utilized in connection with many other system and facility applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A power converter comprising a plurality of power conversion modules, wherein at least one of said power conversion modules comprises a plurality of power conversion devices defining a three-level bridge, wherein a first power conversion module comprises four terminals comprising one of a positive terminal and a negative terminal, an output terminal, a first neutral terminal, and a second neutral terminal, wherein said first neutral terminal is coupled to a direct current (DC) link and said second neutral terminal is coupled to a second power conversion module, wherein said first neutral terminal and said second neutral terminal at least partially define a neutral bus extending between said first power conversion module and said second power conversion module.

2. The power converter in accordance with claim 1, wherein one of said positive terminal and said negative terminal is positioned proximate said first neutral terminal.

3. The power converter in accordance with claim 1, wherein said three-level bridge defines a first commutating loop and a second commutating loop.

4. The power converter in accordance with claim 3, wherein said first commutating loop comprises a series circuit comprising at least one diode, at least one semiconductor switching device, at least one capacitive device, at least one of said positive terminal, said negative terminal, and said first neutral terminal.

5. The power converter in accordance with claim 3, wherein said second commutating loop comprises a series circuit comprising at least one capacitive device, one of said positive terminal and said negative terminal, one of said first neutral terminal and said second neutral terminal, and said output terminal.

6. The power converter in accordance with claim 3, wherein said first commutating loop and said second commutating loop are each configured to have predetermined inductance values that that facilitate flux cancellation in said commutation loops when current flows therethrough, thereby facilitating a reduction of energy stored within loop currents induced therein.

7. The power converter in accordance with claim 1, further comprising:
at least one heat sink device; and,
said neutral bus thermally coupled to and extending around at least a portion of said heat sink device.

8. The power converter in accordance with claim 7, further comprising:
said first power conversion module positioned on a first side of said heat sink device; and,
said second power conversion module positioned on an opposing second side of said heat sink device, wherein said neutral bus extends through said first power conversion module and said second power conversion module.

9. A method of assembling a power converter, said method comprising:
providing a first power conversion module and a second power conversion module, wherein each power conversion module defines a three-level bridge; and,
forming a four terminal circuit within the first power conversion module comprising:
coupling one of a positive terminal and a negative terminal to one of a positive conduit and a negative conduit, respectively;
coupling a first neutral terminal to a direct current (DC) link; and,
coupling a second neutral terminal to the second power conversion module; and,
extending a neutral bus at least partially defined by the first neutral terminal and the second neutral terminal between the first power conversion module and the second power conversion module.

10. The method in accordance with claim 9, further comprising positioning one of the positive terminal and the negative terminal proximate the first neutral terminal.

11. The method in accordance with claim 9, further comprising forming a first commutating loop and a second commutating loop, wherein the first commutating loop and the second commutating loop are each configured to have predetermined inductance values that facilitate flux cancellation in the commutation loops when current flows therethrough, thereby facilitating a reduction of energy stored within loop currents induced therein.

12. The method in accordance with claim 9, further comprising:
providing at least one heat sink device;
thermally coupling the neutral bus to the heat sink device; and,
extending the neutral bus around at least a portion of the heat sink device.

13. The method in accordance with claim 9, further comprising:
coupling the first power conversion module to a first side of the heat sink device;
coupling the second power conversion module to an opposing second side of the heat sink device; and,
extending the neutral bus through the first power conversion module and the second power conversion module.

14. An energy generation facility comprising:
at least one energy generator; and,
a power converter coupled to said energy generator and coupled to an electric power grid, wherein said power converter comprises a plurality of power conversion modules, wherein at least one of said power conversion modules comprises a plurality of power conversion devices defining a three-level bridge, wherein a first power conversion module comprises four terminals comprising one of a positive terminal and a negative terminal, an output terminal, a first neutral terminal, and a second neutral terminal, wherein said first neutral terminal is coupled to a direct current (DC) link and said second neutral terminal is coupled to a second power conversion module, and wherein said first neutral terminal and said second neutral terminal at least partially define a neutral bus extending between said first power conversion module and said second power conversion module.

15. The facility in accordance with claim 14, wherein one of said positive terminal and said negative terminal is positioned proximate said first neutral terminal.

16. The facility in accordance with claim 14, wherein said three-level bridge defines a first commutating loop comprising a series circuit comprising at least one diode, at least one semiconductor switching device, at least one capacitive device, at least one of said positive terminal, said negative terminal, and said first neutral terminal.

17. The facility in accordance with claim 14, wherein said three-level bridge defines a second commutating loop comprising a series circuit comprising at least one capacitive device, one of said positive terminal and said negative terminal, one of said first neutral terminal and said second neutral terminal, and said output terminal.

18. The facility in accordance with claim 14, wherein said three-level bridge defines a first commutating loop and a second commutating loop that are each configured to have predetermined inductance values that facilitate flux cancellation in said commutation loops when current flows therethrough, thereby facilitating a reduction of energy stored within loop currents induced therein.

19. The facility in accordance with claim 14, further comprising:
at least one heat sink device; and,
said neutral bus thermally coupled to and extending around at least a portion of said heat sink device.

20. The facility in accordance with claim 19, further comprising:
said first power conversion module positioned on a first side of said heat sink device; and,
said second power conversion module positioned on an opposing second side of said heat sink device, wherein said neutral bus extends through said first power conversion module and said second power conversion module.

* * * * *